United States Patent
Grosser, Jr. et al.

(10) Patent No.: US 6,473,798 B1
(45) Date of Patent: Oct. 29, 2002

(54) METHOD AND SYSTEM FOR TESTING A LAYER-2 TUNNEL IN A DATA COMMUNICATION NETWORK

(75) Inventors: Donald Bruce Grosser, Jr.; Gregg William Miller, both of Apex; Leo Temoshenko, Raleigh, all of NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/211,322

(22) Filed: Dec. 15, 1998

(51) Int. Cl.$^7$ ............................................. G06F 15/173
(52) U.S. Cl. ...................................... 709/224; 709/227
(58) Field of Search ............................. 709/224, 223, 709/227, 230, 238, 246; 370/401, 466, 467, 397; 713/201

(56) References Cited

U.S. PATENT DOCUMENTS

| | | | |
|---|---|---|---|
| 4,055,808 A | * 10/1977 | Holsinger et al. | ............ 325/67 |
| 4,750,175 A | 6/1988 | Brenneman et al. | |
| 5,220,641 A | 6/1993 | Shima et al. | |
| 5,381,515 A | 1/1995 | Platt et al. | |
| 5,563,875 A | 10/1996 | Hefel et al. | |
| 5,666,467 A | 9/1997 | Colak | |
| 5,668,800 A | 9/1997 | Stevenson | |
| 5,982,753 A | * 11/1999 | Pendleton et al. | .......... 370/252 |
| 6,094,437 A | * 7/2000 | Loehndorf, Jr. et al. | .... 370/420 |
| 6,160,871 A | * 12/2000 | DuRee et al. | .................. 379/9 |
| 6,282,678 B1 | 8/2001 | Snay et al. | |

FOREIGN PATENT DOCUMENTS

| | | |
|---|---|---|
| GB | 2317308 A | 3/1998 |
| JP | 98-070566 | 3/1998 |
| WO | WO 98/02821 | 1/1998 |

OTHER PUBLICATIONS

IBM Networking, "The Layer 2 Tunneling Protocol (L2TP) in an IBM Virtual Private Network (VPN)", 5 pgs.

Hsieh J. et al., Experimental Study of Extended HIPPI Connections over ATM Networks, Proceedings IEEE INFOCOM '96. (Cat. No. 96CB35887), San Francisco, CA, USA, 24–28, Mar. 1996, Vol. 3, pp. 1261–1268.

Alden, K. F. and Wobber, E. P., The AltaVista Tunnel: using the Internet to extend corporate networks, Digital Technical Journal, 1997, vol. 9, No. 2, pp. 5–16.

Malkin, G. S., Dial–in virtual private networks using layer 3 tunneling, Proceedings 22nd Annual Conference on Local Computer Networks, 1997, (Cat. No. 97TB100179), pp. 555–561.

Hsieh, J. et al., HIPPI over ATM Networks, Extending Connections for Distributed Computing, IEEE, Distributed Computing, Oct.–Dec. 1997, pp. 40–53.

\* cited by examiner

*Primary Examiner*—Ario Etienne
(74) *Attorney, Agent, or Firm*—Cesari and McKenna, LLP; A. Sidney Johnston

(57) ABSTRACT

A method and system for testing a Layer 2 tunnel in a data communication network including a network device and a network manager are described. According to the method, a test invocation is received from the network manager at the network device. In response to receipt of the test invocation at the network device, a Layer 2 tunnel within the data communication network is tested, and a result of the test is reported to the network manager. The tests that may be conducted include a connectivity test to determine if a Layer 2 tunnel can be established and a responsiveness test to determine the propagation time of a Layer 2 tunnel. Advantageously, both compulsory and voluntary Layer-2 tunnels can be tested, thereby enabling all Layer 2 protocols (e.g., L2TP, L2F, and PPTP) to be supported.

22 Claims, 3 Drawing Sheets

METHOD AND SYSTEM FOR TESTING A LAYER-2 TUNNEL IN A DATA COMMUNICATION NETWORK

BACKGROUND OF THE INVENTION

1. Technical Field

The present invention relates in general to data communication and in particular to data communication over a virtual private network (VPN) within a public network such as the Internet. Still more particularly, the present invention relates to a method and system for testing characteristics, such as connectivity and responsiveness, of a Layer 2 tunnel in a VPN.

2. Description of the Related Art

Over the past several years, there has been explosive growth in the Internet, which is a decentralized collection of interconnected networks and gateways that utilize the TCP/IP (Transmission Control Protocol/Internet Protocol) protocol suite to communicate. These networks include governmental, educational, commercial, and other networks, which include numerous servers, routers, and other network devices that store information and route data packets between end stations. The Internet is a public network, meaning that access to the Internet is unregulated and is available to anyone with an Internet Service Provider (ISP) dial-up account or dedicated line. Because of the absence of access regulation and inconsistent security enforcement across its constituent networks, data communication over the Internet is vulnerable to interception, redirection, and other forms of tampering.

In order to provide an enhanced level of security for communication conducted over the Internet (or other public network), Virtual Private Networks (VPNs) were developed. A VPN is a set of devices that communicate over a public network utilizing a common encryption scheme that protects communication between the devices from being easily intercepted or otherwise tampered with. Thus, a VPN advantageously permits authenticated users belonging to the VPN to communicate over the public network as if they had a dedicated line.

Often the ultimate end stations for which communication over a VPN within the Internet is to be established belong to networks (e.g., local area networks (LANs)) that do not utilize the TCP/IP protocol suite, but instead utilize other network and transport protocols such as the SPX/IPX (Sequenced Packet exchange/Internetwork Packet eXchange) protocol employed by Novell NetWare or the NetBIOS protocol developed by International Business Machines (IBM) Corporation of Armonk, New York. As a result, if VPNs are to be supported for such end stations, some mechanism is required to transport the data packets built utilizing these non-IP protocols over the IP protocol networks comprising the Internet. This mechanism is known in the art as tunneling.

Tunneling simply means that a data packet from a first protocol (e.g., a non-IP protocol) is encapsulated in a data packet of a second protocol (e.g., the IP protocol) in order to transport the data packet over a network utilizing the second protocol. VPNs support four types of tunnels: (1) an IPSec tunnel implemented at Layer 3 and defined by the Internet Engineering Task Force (IETF) IPSec standard; (2) a Layer 2 Tunneling Protocol (L2TP) tunnel implemented at Layer 2 and defined by IETF Standards Track Internet draft; (3) a Layer-2 Forwarding (L2F) tunnel that is commercially used by Cisco Systems and defined by Informational RFC 2341; and (4) a Point-to-Point Tunneling Protocol (PPTP) tunnel that is implemented at Layer 2, utilized by products of Microsoft Corporation of Redmond, Washington, and defined by the PPTP Informational Internet draft. All of the above-listed standards are incorporated herein by reference. Of these standards, the L2TP, L2F, and PPTP are all similar in that they are all Layer 2 tunnels that utilize the Point-to-Point Protocol (PPP) defined by RFC 1661.

A variety of network problems may arise that can prevent the proper establishment and/or operation of a Layer 2 tunnel. The present invention recognizes that network administrators currently have no tools to test the connectivity and responsiveness of Layer 2 tunnels and therefore experience difficulty in diagnosing and correcting such problems. The present invention addresses the shortcomings in the art as described below.

SUMMARY OF THE INVENTION

The present invention provides a method and system for testing a Layer 2 tunnel in a data communication network including a network device and a network manager. According to the method of the present invention, a test invocation is received from the network manager at the network device. In response to receipt of the test invocation at the network device, a Layer 2 tunnel within the data communication network is tested, and a result of the test is reported to the network manager. The tests that may be conducted include a connectivity test to determine if a Layer 2 tunnel can be established and a responsiveness test to determine the propagation time of a Layer 2 tunnel. Advantageously, both compulsory and voluntary Layer-2 tunnels can be tested, thereby enabling all Layer 2 protocols (e.g., L2TP, L2F, and PPTP) to be supported.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

As discussed briefly above, the present invention provides a method and system for testing a Layer 2 tunnel. The present invention is applicable to network environments that support either or both of compulsory and voluntary Layer 2 tunneling.

Figure 1:
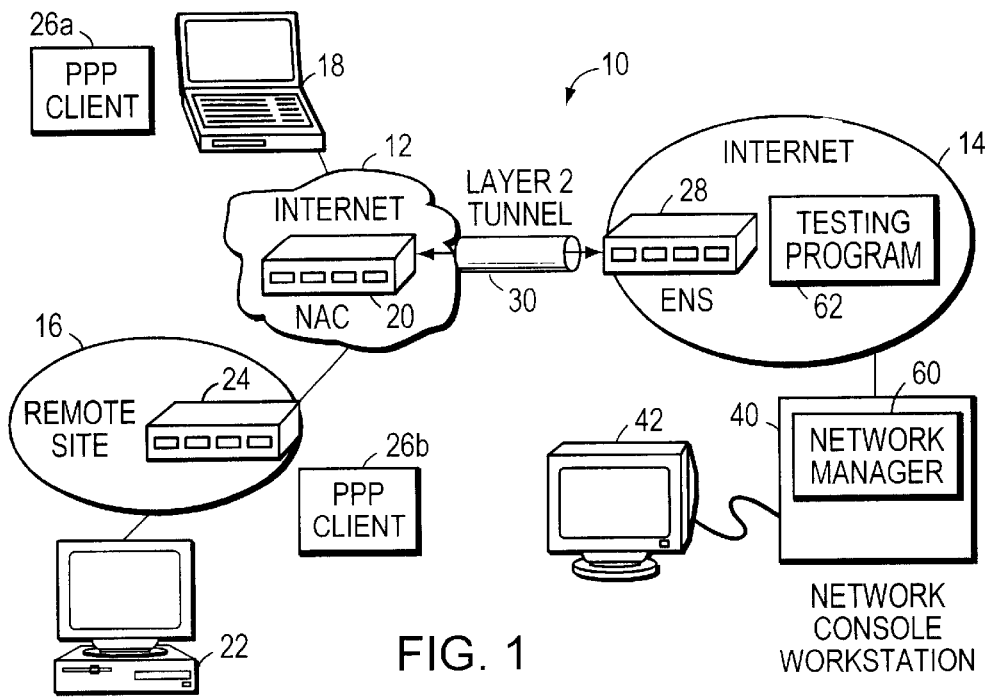
FIG. 1 depicts an exemplary network environment that supports compulsory tunneling.

With reference now to the figures and in particular with reference to FIG. 1, there is depicted an exemplary network environment 10 in accordance with the present invention that supports compulsory Layer 2 tunneling. As illustrated, network environment 10 includes a public data network, such as Internet 12, that permits data communication between a remote site 16 or a mobile host 18 and an intranet 14. As discussed above, Internet 14 is a decentralized collection of interconnected networks and gateways that utilize the TCP/IP (Transmission Control Protocol/Internet Protocol) protocol suite to communicate. The TCP/IP networks comprising Internet 12 include that of an ISP, which contains a network access concentrator (NAC) 20. NAC 20 is a server that supports dial-up access to Internet 12.

Intranet 14, which may reside at a corporate campus, for example, may be implemented as a conventional local area network (LAN) or wide area network (WAN), as are well-known in the art. In the depicted embodiment, intranet 14 employs network and transport layer protocols other than TCP/IP, for example, IPX/SPX or NetBios. As shown, intranet 14 includes an enterprise network server (ENS) 28 that regulates external access to the resources of intranet 28. Depending on the implementation of the firewall of intranet 14, ENS 28 may be positioned inside, behind, or parallel to the intranet firewall. Intranet 14 also has an attached network console workstation 40 and display 42, which can be utilized by a network administrator to monitor and manage intranet 14 and communication with remote site 16 and mobile host 18.

As illustrated in FIG. 1, remote site 16, which may also be implemented as a conventional LAN or WAN, includes one or more end stations 22 and a gateway 24 that couples remote site 16 to Internet 12. Like intranet 14, remote site 16 also employs a non-IP network layer protocol that is preferably the same as that utilized by intranet 14. As depicted, gateway 22 of remote site 16 and mobile host 18 each run a respective PPP client 26a, 26b that communicates with Internet 12 via a dial-up connection with the ISP's NAC 20, where each such dial-up connection is governed by PPP. In the network embodiment shown in FIG. 1, PPP clients 26a and 26b are conventional PPP clients and, as such, are not tunneling-enabled.

To permit secure access to intranet 14 from mobile host 18 and remote site 16, the ISP including NAC 20 provides compulsory tunneling service to intranet 14. To obtain such access, a PPP client 26 first places a call to the ISP's NAC 20, which maintains the IP address of ENS 28 and a list of authorized PPP clients 26. NAC 20 and the PPP client 26 then negotiate PPP link parameters using the PPP Link Control Protocol (LCP). NAC 20 also derives virtual-dialup service parameters using the PPP username obtained from PPP client 26. NAC 20 then attempts to build a Layer 2 tunnel 30 to ENS 28 by passing LCP and authentication information to ENS 28. In the compulsory tunneling environment depicted in FIG. 1, Layer 2 tunnel 30 will utilize L2TP, L2F, or PPTP. After ENS 28 authenticates the PPP username and password through the Layer 2 tunnel 30 and completes Network Control Protocol (NCP) negotiations, all traffic flows between PPP client 26 and ENS 28 through Layer 2 tunnel 30, with NAC 20 simply forwarding data packets.

Figure 2:
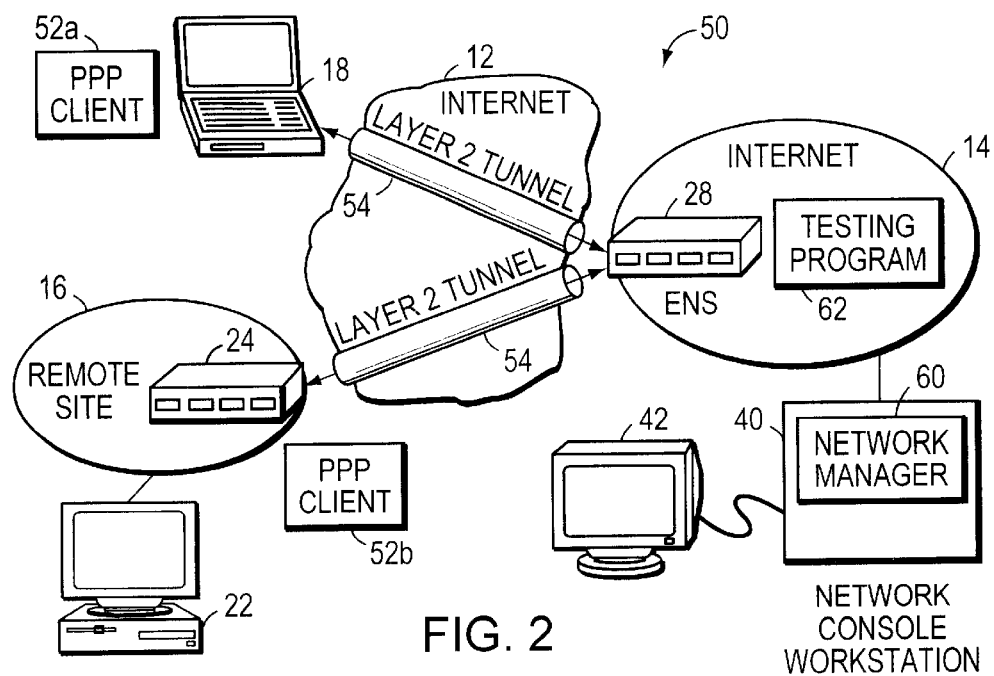
FIG. 2 illustrates an exemplary network environment that supports voluntary tunneling.

Referring now to FIG. 2, there is illustrated an exemplary network environment 50 in accordance with the present invention having voluntary Layer 2 tunneling. As indicated by like reference numerals, network environment 50 includes Internet 12, intranet 14, network console workstation 40, display 42, remote site 16, end station(s) 22, and gateway 24 as discussed above with respect to FIG. 1. Network environment 50 of FIG. 2 differs from network environment 10 of FIG. 1 in that mobile host 18 and gateway 24 run PPP clients 52a and 52b that are Layer 2 tunneling (e.g., L2TP or PPTP) enabled. Thus, in contrast to the compulsory tunneling illustrated in FIG. 1, the voluntary tunneling illustrated in FIG. 2 is transparent to the ISP since Layer 2 tunnels 54 can be built that extend from PPP clients 52 to ENS 28 of intranet 14.

In the voluntary tunneling environment of FIG. 2, a PPP client 52 first gains access to Internet 12 by dialing into a NAC (not illustrated) at the ISP. Next, a virtual dial-up session is placed by PPP client 52 across Internet 12 utilizing the IP address of ENS 28. After tunnel establishment, a tunneled PPP session is entirely negotiated between PPP client 52 and ENS 28. The decision to tunnel is based on pre-configured information residing at the initiating PPP client 52 and is totally transparent to the ISP.

The three Layer 2 tunnels discussed above do not themselves specify or provide data security. However, PPP or IPSec packet encryption can be utilized in conjunction with Layer 2 VPN tunneling to provide packet security at least between tunnel endpoints.

As noted briefly above, both the compulsory tunneling environment of FIG. 1 and the voluntary tunneling environment of FIG. 2 are subject to network problems that can prevent the proper establishment and/or operation of a Layer 2 VPN tunnel. In the past, there was no facility available to a network administrator that would permit the network administrator to easily diagnose and remedy such problems from a remote host. The present invention addresses this shortcoming in the art by allowing Layer 2 tunnels within both compulsory and voluntary tunneling network environments to be tested from a host, such as network console workstation 40 of intranet 14. In a preferred embodiment of the present invention, such Layer 2 tunnel testing is directed by a network manager application 60 executed by network console workstation 40 and performed by a testing program 62 executed by the processing resources of a network device such as ENS 28. The result of each test is presented to a network administrator via the display 42 attached to network console workstation 40. As discussed below in greater detail, the tests that may be performed include connectivity, that is, a determination of whether a Layer 2 tunnel can be built, and responsiveness, that is, the propagation time of a Layer 2 tunnel.

Figure 3:
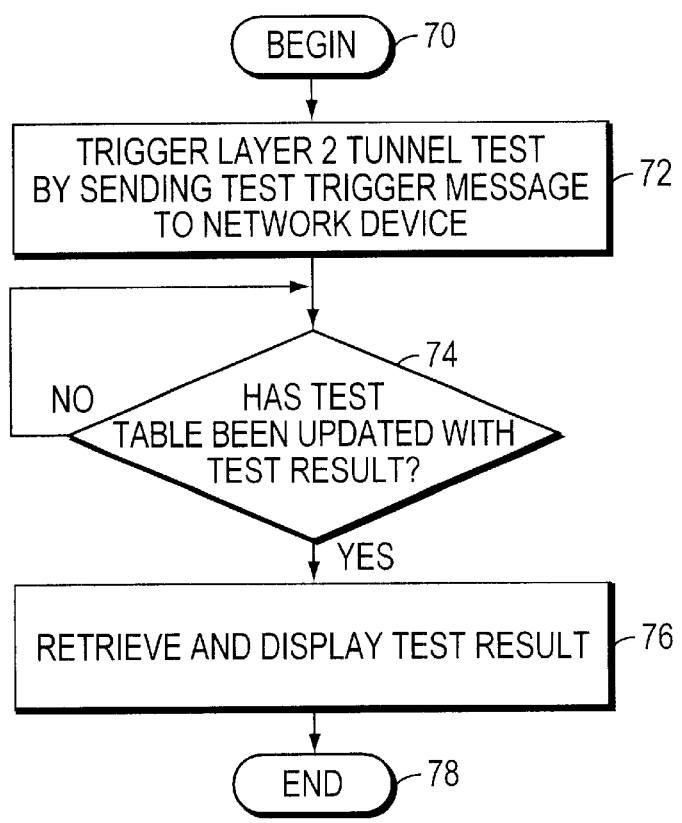
FIG. 3 is a high level logical flowchart of the operation of a network manager program that directs testing of a Layer 2 tunnel in accordance with the present invention.

With reference now to FIG. 3, there is depicted a high level logical flowchart of an illustrative embodiment of a method by which network manager application 60 can direct the testing of a Layer 2 tunnel in accordance with the present invention. The process shown in FIG. 3 can either be performed in response to selected inputs by a network administrator at network console workstation 40 or in an automated fashion in the course of regular network monitoring by network manager 60.

As illustrated, the process begins at block 70 and thereafter proceeds to block 72, which illustrates network manager 60 triggering a test of the connectivity or responsiveness of a Layer 2 tunnel by sending an appropriate message to a network device, for example, ENS 28, that can serve as a Layer 2 tunnel endpoint. The message, which can be conveyed, for example, via Simple Network Management Protocol (SNMP) or a telnet session to the network device's console, specifies the type of test to be conducted by the network device. The process then iterates at block 74 until the network device requested to perform the test updates a test table (as explained below) with the result of the test. Once the network device has updated the test table with the result of the test, network manager 60 retrieves the test result and displays the test result within display 42, as depicted at block 76. Thereafter, the test terminates at block 78. Based upon the results of the test, a network administrator can then be assured that tunneling is functioning properly or can take remedial action to correct problems with tunnel connectivity or responsiveness. Of course, additional network monitoring and administration capabilities can be incorporated within network manager 60 so that any necessary remedial action can be performed from network console workstation 40.

Figure 4:
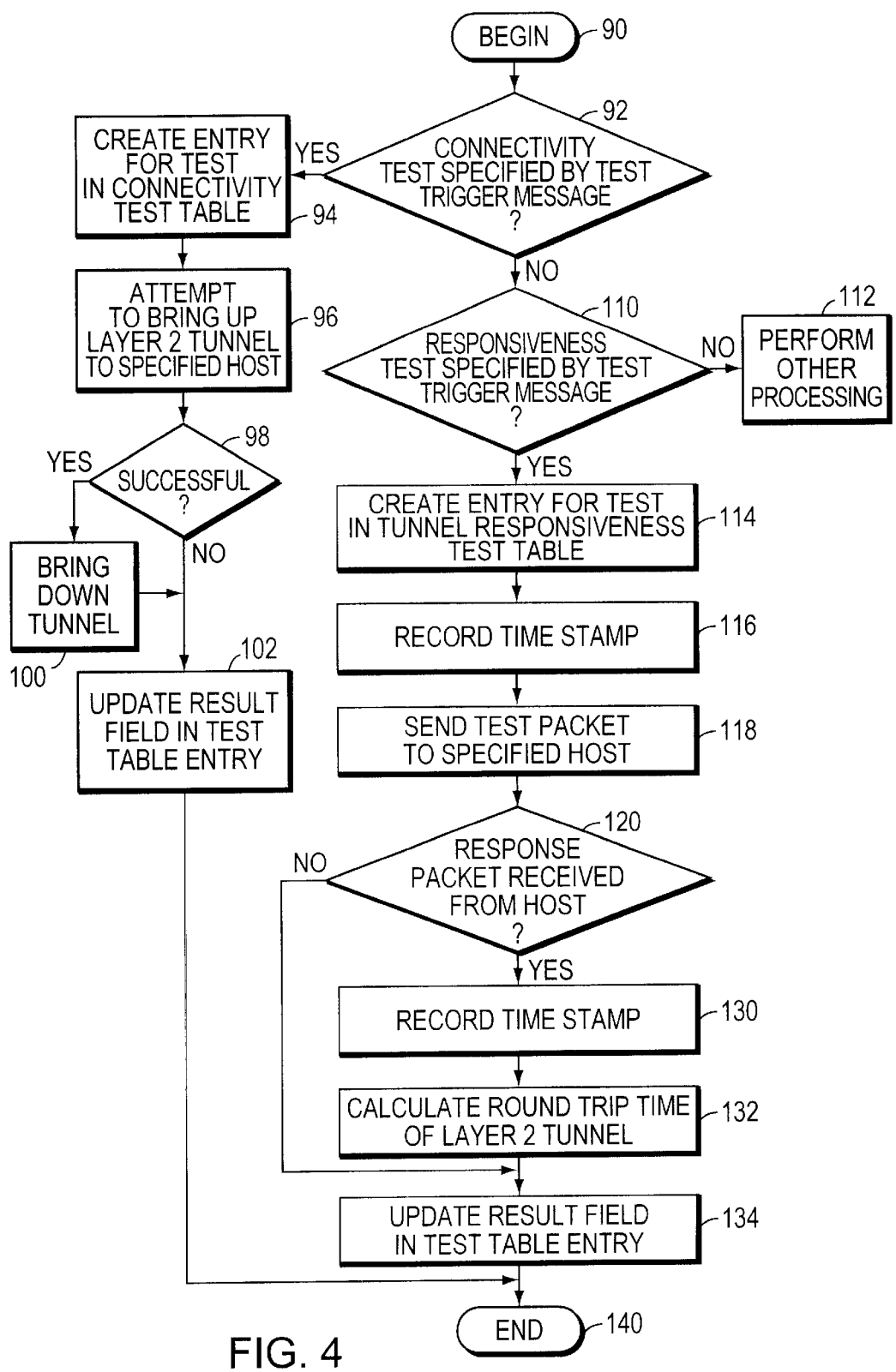
FIG. 4 is a high level logical flowchart of the operation of a network device that, in accordance with the present invention, tests a Layer 2 tunnel under the direction of a network manager program.

Referring now to FIG. 4, there is illustrated a high level logical flowchart of an illustrative embodiment of a method by which a network device can test a Layer 2 tunnel under the direction of network manager 60 in accordance with the present invention. As noted above, the process shown in FIG. 4 is preferably implemented in software, which is executed by the processing resources of the network device in order to perform the steps described below. As will be appreciated by those skilled in the art, such a testing program 62 can reside in volatile memory or non-volatile storage at the network device or elsewhere within the network environment.

As depicted, the process begins at block 90 in response to receipt by the network device (hereafter assumed to be ENS 28) of a test trigger message from network manager 60. The process then proceeds to block 92, which illustrates a determination by ENS 28 if the test trigger message specifies a Layer 2 tunnel connectivity test. If not, the process passes to block 110, which is described below. However, if the test trigger message specifies a Layer 2 tunnel connectivity test, the process proceeds to block 94.

Figures 5A, 5B:
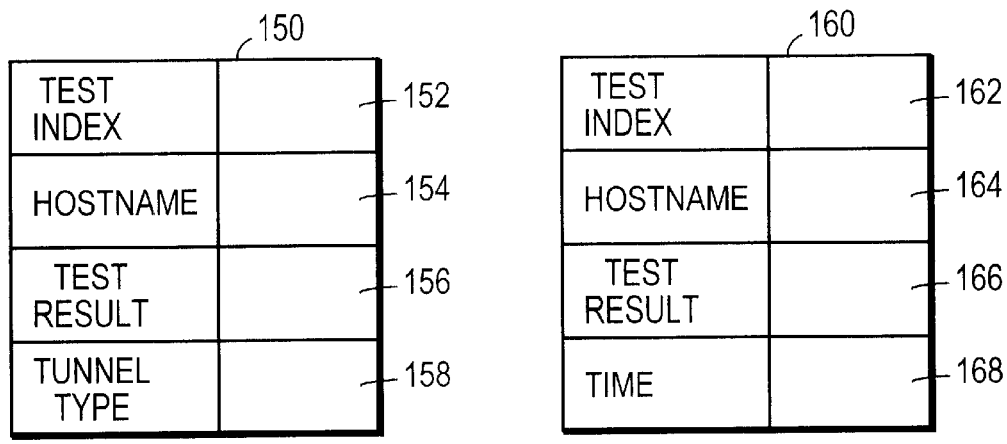
FIG. 5A depicts an illustrative embodiment of an entry within a tunnel connectivity test table in accordance with the present invention.
FIG. 5B illustrates an exemplary embodiment of an entry within a tunnel responsiveness test table in accordance with present invention.

Block 94 illustrates ENS 28 creating an entry within a tunnel connectivity test table (at ENS 28) for the test. As illustrated in FIG. 5A, each entry 150 in the tunnel connectivity test table preferably includes a test index field 152 that identifies the test by number, a hostname field 154 that specifies the other tunnel endpoint, a test result field 156 that indicates the test result, if known, and "in progress" if unknown, and a tunnel type field 158 that specifies the type of Layer 2 tunnel (i.e., L2TP, L2F, PPTP). The test index and hostname are preferably both specified by network manager 60 in the test trigger message. The tunnel type may also be specified by an identifier in the test trigger message that matches an entry in a configuration list maintained at ENS 28 or elsewhere within the network. Following block 94, the process then passes to block 96, which depicts ENS 28 attempting to bring up a Layer 2 tunnel to the specified hostname.

The actions necessary to bring up a Layer 2 tunnel depends on the tunneling protocol utilized in the test. If the specified tunneling protocol is L2TP, a valid Start Control Connection ReQuest (SCCRQ) packet is sent via UDP (User Datagram Protocol) to the host that forms the other endpoint of the tunnel. If the tunnel is successfully built, a Start Control Connection Reply (SCCRP) packet will be received from the host. If the tunneling protocol is L2F, ENS 28 constructs a tunnel to the specified host by sending an L2F-CONF, receiving an L2F-CONF, sending an L2F-OPEN, and receiving an L2F-OPEN all via UDP port 1701. (UDP port 1701 is a well-known port which specifies L2F/L2TP traffic.) If all these packets are sent and received, a tunnel is successfully established. Finally, if the tunneling protocol is PPTP, ENS 28 attempts to bring up a tunnel by sending a valid SCCRQ packet to the specified host via TCP. A successful tunnel establishment entails receiving a SCCRP from the host with a successful result code.

If ENS 28 receives a bad result code or receives no response from the host, the connectivity test is deemed unsuccessful, and the process proceeds to block 102, which illustrates updating test result field 156 with the test result. Examples of unsuccessful results that may be recorded within test result field 156 include "host not responding", "local authentication failure" or "remote authentication failure." Of course, the ability to provide the more specific result messages depends upon whether a result code (rather than no response) was received.

If, on the other hand, the Layer 2 tunnel was successfully brought up, the process passes from block 96 through block 98 to block 100, which illustrates ENS 28 bringing down the Layer 2 tunnel. For L2TP, bringing down the tunnel entails issuing a Stop Control Connection Request to the host via UDP. For L2F, the tunnel is collapsed by sending an L2F-CLOSE packet to the host via UDP port 1701. For PPTP, the Layer 2 is brought down by sending a Stop Control Connection Request to the host via TCP. In addition, as shown at block 102, test result field 156 is updated with from "in progress" to "successful" or "tunnel already exists," as the case may be. Following block 102, the process terminates at block 140.

Referring again to block 110, in response to a determination that the test trigger message does not specify a Layer 2 tunnel responsiveness test, the process passes to block 112, which illustrates ENS 28 performing other processing. However, if the test trigger message does specify a Layer 2 tunnel responsiveness test, the process passes to block 114, which depicts ENS 28 creating an entry for the test in a tunnel responsiveness test table at ENS 28. As depicted in FIG. 5B, each entry 160 in the tunnel responsiveness test table preferably includes a test index field 162 that identifies the test by number, a hostname field 164 that specifies the other tunnel endpoint, a test result field 166 that indicates the test result, if known, and "in progress" if unknown, and a time field 168 that specifies the round trip time of communication through the Layer 2 tunnel. The test index and hostname are preferably both specified by network manager 60 in the test trigger message. As discussed above, the tunnel type can also be specified by an identifier in the test trigger message that matches an entry in a configuration list. Following block 114, the process then passes to blocks 116 and 118, which illustrate ENS 28 recording a time stamp and sending a test packet to the specified host via a Layer 2 tunnel.

If the Layer 2 tunnel utilizes L2TP, the test packet is preferably an L2TP Hello, which should receive an L2TP acknowledgement on the UDP tunnel control channel. If the Layer 2 tunnel utilizes L2F, the test packet is preferably an L2F_ECHO, which should receive an L2F_ECHO_RESP on UDP port 1701. Alternatively, if the Layer 2 tunnel utilizes PPTP, the test packet is preferably a PPTP Echo-request, which should receive a PPTP Echo-reply via TCP.

If no response packet is received from the host, the test fails, and the process passes from block 118 through block 120 to block 134, which illustrates writing a result message such as "host not responding" or "tunnel down" in test result field 165 of the test's entry 160. However, if a response packet is received from the specified host, the process passes from block 118 though block 120 to block 130. Block 130 depicts ENS 28 recording a time stamp of the time the response packet was received. Utilizing this time stamp and the first time stamp recorded at block 116, ENS 28 computes a round trip time and stores the round trip time in time field 168 of the test's entry 160. In addition, as illustrated at block 134, test result field 166 is updated to "successful." Thereafter, the process illustrated in FIG. 4 terminates at block 140.

As has been described, the present invention provides a method and system for testing Layer 2 tunnels from a host within a network, such as a network console workstation. In particular, the present invention supports both connectivity and responsiveness test for all types of Layer 2 tunnels, including L2TP, L2F, and PPTP. Utilizing the results provided by the present invention, a network administrator can either confirm that Layer 2 tunnels are operating correctly or can correct any detected problem. Because any tunnel brought up by a test is collapsed after the test completes, network device resources are conserved.

While the invention has been particularly shown and described with reference to an illustrative embodiment, it will be understood by those skilled in the art that various changes in form and detail may be made therein without departing from the spirit and scope of the invention. For example, although the present invention has been described with respect to illustrative network embodiments in which the network device that tests Layer 2 tunnels under the direction of the network manager is a network server, it should be understood that the functionality of the present invention could also be incorporated with other network devices, such as bridges and routers. Moreover, although aspects of the present invention have been described with respect to a network device executing software that directs the method of the present invention, it should be understood that present invention may alternatively be implemented as a program product for use with a data processing system. Programs defining the functions of the present invention can be delivered to a computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A method for testing a tunnel in a data communication network, said method comprising:

receiving a test invocation from a network manager at a network device;

in response to receipt of said test invocation at the network device, attempting to establish a Layer-2 tunnel; and in response to establishing a Layer-2 tunnel, bringing down said Layer-2 and indicating a result of said test as successful.

2. A method for testing a tunnel in a data communication network, said method comprising:

receiving a test invocation from a network manager at a network device;

in response to receipt of said test invocation at the network device, testing a propagation time of said Layer-2 tunnel; and, reporting a result of said test to said network manager.

3. A method for testing a tunnel in a data communication network, said method comprising:

receiving a test invocation from a network manager at a network device;

in response to receipt of said test invocation at the network device, creating a table entry at said network device specifying an endpoint of said Layer-2 tunnel; and reporting said table entry as a result of said test to said network manager.

4. The method of claim 1 or claim 2 or claim 3, wherein testing said Layer-2 tunnel comprises testing connectivity of said Layer-2 tunnel.

5. The method of claim 3, said table entry further comprising:

a result field, wherein reporting a result of said test to said network manager includes, updating said result field with a result of said test; and wherein said network device reports said result to said network manager in response to receipt of a request from said network manager.

6. The method of claim 1 or claim 2 or claim 3 further comprising:

in response to receipt of said result at said network manager, presenting said result.

7. The method of claim 1 or claim 2 or claim 3 wherein testing a Layer-2 tunnel comprises testing a voluntary Layer-2 tunnel.

8. The method of claim 1 or claim 2 or claim 3 wherein testing a Layer-2 tunnel comprises testing a compulsory Layer-2 tunnel.

9. A program product for testing a tunnel in a data communication network, said program product having instructions for executing in a processor the method of claim 1 or claim 2 or claim 3.

10. The program product of claim 9, wherein said program tests connectivity of the Layer-2 tunnel.

11. The program product of claim 9, further comprising:

a table entry including a result field, wherein said program product updates said result field with a result of said test and supplies said result in response to receipt of a request.

12. A network device for use in a data communication network comprising:

the network device, in response to receipt of a test invocation from a network manager, establishes a Layer-2 tunnel, and if said Layer-2 tunnel is established said network device brings down said Layer-2 tunnel and indicates a result of the test as successful.

13. A network device for use in a data communication network comprising:

the network device, in response to receipt of a test invocation from a network manager, tests a Layer-2 tunnel in the communication network by testing a propagation time of the Layer-2 tunnel, and reports a result of said test to the network manager.

14. A network device for use in a data communication network comprising:

the network device, in response to receipt of a test invocation from a network manager, tests a Layer-2 tunnel by creating a table entry specifying an endpoint of said Layer-2 tunnel, and reports a result of said test to the network manager.

15. The network device of claim 14, said table entry further comprising:

a result field, wherein said network device updates said result field with a result of said test and reports said result to the network manager in response to receipt of a request from the network manager.

16. The network device of claim 12, or claim 13, or claim 14 wherein said network device comprises a server.

17. A system, comprising:
   a network device in accordance with claim 12, or claim 13, or claim 14 that is coupled to said data communication network; and
   a host coupled to said network device that executes said network manager.

18. The network device of claim 12, or claim 13, or claim 14 wherein said network device tests connectivity of the Layer-2 tunnel.

19. A network device for use in a data communication network comprising: means, in response to receipt of a test invocation from a network manager, for establishing a Layer-2 tunnel, and if said Layer-2 tunnel is established;
   means for said network device bringing down said Layer-2 tunnel and indicating a result of the test as successful.

20. A network device for use in a data communication network comprising:
   means, in response to receipt of a test invocation from a network manager, for testing a Layer-2 tunnel in the communication network by testing a propagation time of the Layer-2 tunnel; and,
   means for reporting a result of said test to the network manager.

21. A network device for use in a data communication network comprising:
   means, in response to receipt of a test invocation from a network manager, testing a Layer-2 tunnel by creating a table entry specifying an endpoint of said Layer-2 tunnel; and,
   means for reporting a result of said test to the network manager.

22. Electromagnetic signals propagating on a computer network, said electromagnetic signals carrying information to execute in a processor for the practice of the method of claim 1 or claim 2 or claim 3.

* * * * *